United States Patent [19]
Stitt

[11] Patent Number: 6,120,151
[45] Date of Patent: Sep. 19, 2000

[54] SYSTEM AND METHOD FOR TRANSPORTING FILM AND MOTION PICTURE PROJECTOR UTILIZING SAME

[75] Inventor: Robert I. Stitt, Morgan Hill, Calif.

[73] Assignee: Advanced Image Systems, Inc., Los Altos, Calif.

[21] Appl. No.: 09/193,373

[22] Filed: Nov. 17, 1998

[51] Int. Cl.[7] .................. G03B 1/00; G03B 1/56; G03B 9/08
[52] U.S. Cl. .................. 352/184; 352/159; 352/204
[58] Field of Search ................ 352/38, 56, 57, 352/69–71, 123, 129, 135, 159, 163, 164, 165, 166, 174, 182, 184, 186–191, 194, 207, 185; 226/36; 396/416, 398, 399, 400

[56] References Cited

U.S. PATENT DOCUMENTS

| | | | |
|---|---|---|---|
| 3,214,233 | 10/1965 | Persidsky | 352/184 |
| 3,494,524 | 2/1970 | Jones | 226/4 |
| 3,600,073 | 8/1971 | Shaw | 352/184 |
| 3,944,349 | 3/1976 | Jones | 352/184 |
| 4,113,366 | 9/1978 | Glover | 352/6 |
| 4,114,996 | 9/1978 | Shaw | 352/184 |
| 4,365,877 | 12/1982 | Shaw | 352/184 |
| 4,441,796 | 4/1984 | Shaw | 352/184 |
| 4,534,630 | 8/1985 | Williamson | 352/194 |
| 4,835,555 | 5/1989 | Maxwell | 352/194 |
| 4,957,361 | 9/1990 | Shaw | 352/59 |
| 4,966,454 | 10/1990 | Toporkiewicz | 352/59 |
| 4,971,435 | 11/1990 | Shaw et al. | 352/59 |
| 4,993,828 | 2/1991 | Shaw et al. | 352/59 |
| 4,997,270 | 3/1991 | Shaw | 352/57 |
| 5,050,985 | 9/1991 | Shaw et al. | 352/184 |
| 5,341,182 | 8/1994 | Schmidt | 352/184 |
| 5,402,191 | 3/1995 | Dean et al. | 352/63 |
| 5,587,750 | 12/1996 | Gibbon et al. | 352/184 |
| 5,806,953 | 9/1998 | Kucera et al. | 353/122 |

*Primary Examiner*—Russell Adams
*Assistant Examiner*—Rodney Fuller
*Attorney, Agent, or Firm*—Carr & Ferrell LLP

[57] ABSTRACT

A system and method are disclosed for transporting film in a motion film projector. The system includes a set of film carriages and a set of secondary shutters mounted on a conveyor, which continually advances the film carriages and the secondary shutters along a linear path oriented orthogonally with respect to an optical axis of a aperture block, through which images on the film are projected. Each film carriage receives a loop of film and then rolls the loop of film in the direction of the aperture block. A deceleration mechanism periodically engages and decelerates the film. Once the film has been decelerated, a section of the film is temporarily secured in alignment with the aperture block and an image disposed on the film is projected. The conveyor then moves a secondary shutter into alignment with the aperture block to shutter the aperture block.

20 Claims, 7 Drawing Sheets

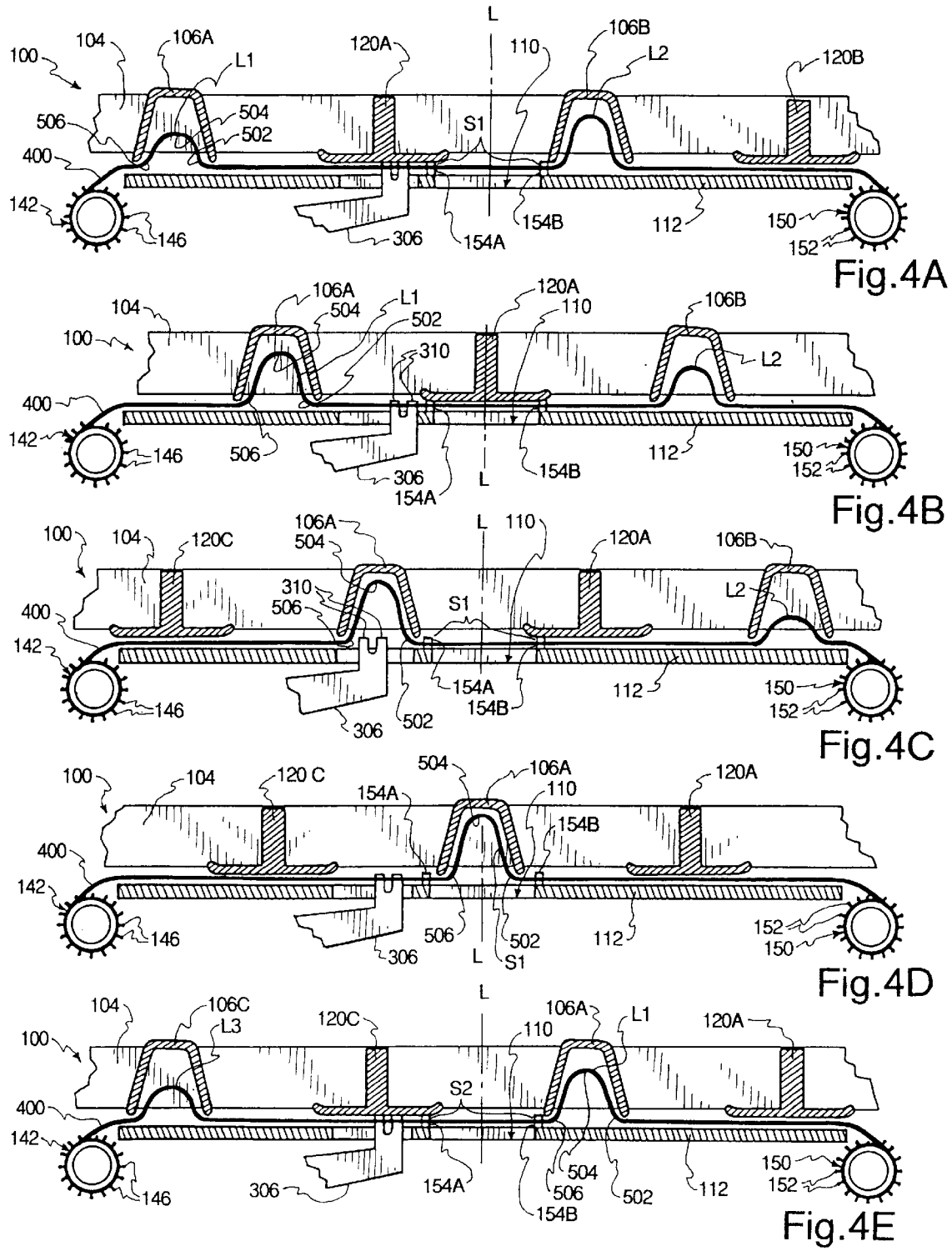

SYSTEM AND METHOD FOR TRANSPORTING FILM AND MOTION PICTURE PROJECTOR UTILIZING SAME

BACKGROUND OF THE INVENTION

1. Field of the Invention

The present invention relates generally to motion picture projectors, and more particularly to film transport systems and methods by which film is advanced through a motion picture projector.

2. Description of the Background Art

Motion picture film consists of a succession of still images or frames, which are sequentially projected onto a surface to produce the illusion of motion. A motion film projector is configured to transport each frame from a feed reel or spool to an aperture block, where it is held in stationary register for a period of time required for projection of the associated image. The frame is thereafter transported to a take-up reel or spool. Similarly, a motion film camera is configured to transport each unexposed frame from a first location to the aperture block, where the frame is held in stationary register during exposure of the frame, and thereafter to a second location in the camera.

Large-format motion picture film projectors conventionally employ a rotor-stator rolling loop design to transport film in the desired manner. Projectors of this type have a relatively large rotor adapted with angularly spaced gaps and a curved stator for guiding the film between the rotor and the stator. As the rotor rotates, loops of film are formed in the rotor gaps, and these gaps move the loop one frame length each time a loop passes a set of stationary register pins on the stator. Each film loop develops continuously in a rotator gap by receiving a continuously fed supply of film as the gap travels from a film inlet to an aperture block. Likewise, each loop diminishes in size as it travels from the aperture block to a film outlet. The stator register pins are positioned adjacent to the aperture block to hold sections of the film stationary during projection. Exemplary film transport mechanisms of the foregoing general description are disclosed in U.S. Pat. Nos. 3,494,524 and 3,600,073 to Jones and Shaw, respectively.

The above-described rolling loop design has several disadvantages associated therewith. One limitation of this design is that the projector lamp assembly must be positioned interiorly of the rotor. This requirement presents significant restraints on the size, shape, and configuration of the projector lamp assembly. In addition, the presence of the rotor about the projector lamp assembly may interfere with access thereto.

Another disadvantage associated with the above-described rolling loop design is that the rotor must be mounted very precisely with respect to the stator. Any shaft wobble or other misalignment will cause the rotor to rub against the film, thereby increasing film wear and decreasing the film's lifetime. This condition is particularly undesirable in large-format film projectors, which utilize film prints costing many thousands of dollars.

Moreover, the rotor element of this rolling loop design is expensive to manufacture. In particular, the rotor element must be machined to relatively tight tolerances. These stringent machine tolerances translate directly into higher manufacturing costs for each rotor, thus raising the cost of manufacturing for each rotor-stator projector system.

Another limitation of conventional projectors, including the rotor-stator projector, is that they tend to be difficult, and therefore expensive, to maintain. In particular, when the rotor bearings wear out, a major overhaul of the projector is typically required to replace the bearings. Such an overhaul requires a significant amount of technician time. Perhaps more importantly, the overhaul process requires a considerable amount of "down time" for the projector. Both the technician time and the projector down time can be very expensive.

An additional limitation of the above-described rolling loop projectors is that they are large and heavy. For example, commercial embodiments of this design weigh on the order of 2,500 lbs. In addition to being heavy, these commercial embodiments are typically about five feet wide, five feet long, and almost six feet in height. Indeed, due to the dimensions and weight of these projectors, they require a relatively large area in which to operate and are difficult to transport. Consequently, the size and weight of these projectors is further and significant disadvantage.

Another proposed film transport system is the straight line transport system described in connection with FIGS. 7 and 7A of U.S. Pat. No. 3,494,524 to Jones mentioned above. This system includes a flexible band with gaps formed therein. Loops of film are then positioned within the gaps and advanced onto and off register pins on the aperture block.

This straight line transport system, however, has several disadvantages. For example, this system does not provide ample shuttering of the film while it is in register with the aperture block. Without properly shuttering the film while it is in register with the aperture block, the projected image will contain a relatively high degree of flicker. Additionally, this system is likely to cause significant wear on the film due to the relatively sharp angles through which the film must pass as it rides in the band gaps. Indeed, as shown in FIG. 7A of the Jones patent, the film must bend through sharp angles adjacent to the leading and trailing edges of the band gaps. Passing film through such angles at the high rates of speed common to such projectors would significantly increase the wear on and, thus, decrease the life of the film passing therethrough.

Accordingly, a need exists to provide a motion picture film projector that does not require a rotor-stator configuration. Moreover, a need exists to provide a motion film projector that permits the lamp housing, to be positioned external of the film advancement mechanism. Another need exists to provide a motion picture film projector that has reduced size and weight to facilitate transport and operation of the projector. Additionally, a need exists to provide a motion picture film projector that limits the wear of the film. Further, a need exists to provide a motion film projector that may be maintained relatively easily and inexpensively.

SUMMARY OF THE INVENTION

The present invention overcomes or substantially alleviates the aforementioned problems associated with prior art motion picture film projectors. The invention provides a projector housing adapted with an aperture block defining an optical axis along which the film's images are projected. A planar loop film transport system includes a conveyor having a linear direction of travel substantially orthogonal with respect to the optical axis (and thus parallel to the plane of the film when held in stationary register with the aperture block). The conveyor has a regularly spaced set of film carriages mounted thereon for advancing loops of film through the projector. As the conveyor advances linearly, the film carriages carry developing loops of film to a position adjacent the aperture block, and carry diminishing loops of film away from the aperture block. A set of secondary shutters, arranged in alternating sequence with the film carriages, may also be secured to the conveyor to intermittently shutter the aperture block.

In one embodiment, the invention includes a deceleration mechanism mounted on the housing for decelerating the film to reduce damage to the film upon being engaged with the stationary register pins. The deceleration mechanism has a pair of claw arms configured to move linearly in a cyclical manner to periodically engage and decelerate the film prior to the films engagement with the register pins.

The method of the present invention includes momentarily securing the film at a point, such as a register pin, so that a first section of the film is in alignment with the aperture block. An input sprocket continuously advances film toward the point by forming a growing film loop and positioning the film loop within a film carriage moving along a straight line orthogonal to the optical axis of the aperture block. As the film carriage advances the film loop toward the aperture block, the size of the loop increases. Before the loop engages the register pins, the deceleration mechanism engages and decelerates the film.

The film carriage then rolls a leading edge of the film loop over the register pins to release the first section of film from the register pins. The film carriage also rolls a trailing edge of the loop over the register pin to secure the trailing edge of the loop at the register pins. In this manner, a second section of film is aligned with the aperture block. Lastly, the conveyor linearly advances the film carriage away from the register pins along a line orthogonal to the aperture block. As the film carriage carries the loop away from the registration pins, the size of the loop gradually and continuously decreases. This method is then repeated to continuously advance sections of film through the projector.

The present system and method for transporting film are advantageous in that they do not require a large and expensive precision-machined rotor and stator. As such, the present invention may be considerably more cost effective to manufacture than conventional rotor-stator motion picture projectors. In addition, because internal projector components do not need to be located within a rotor, or other film advancement device, the components are more accessible than in conventional projectors. Moreover, the present system weighs much less and is considerably smaller than the large conventional rolling loop projectors. The present system is also relatively easy and inexpensive to maintain since a large rotor supported by bearings is unnecessary. Additional advantages and features of the invention will be apparent from the drawings and detailed description as set forth below.

BRIEF DESCRIPTION OF THE DRAWINGS

FIGS. 4A–4E are schematic sectional views illustrating a film cycle according to the present invention.

DETAILED DESCRIPTION OF THE PREFERRED EMBODIMENT

Figure 1:
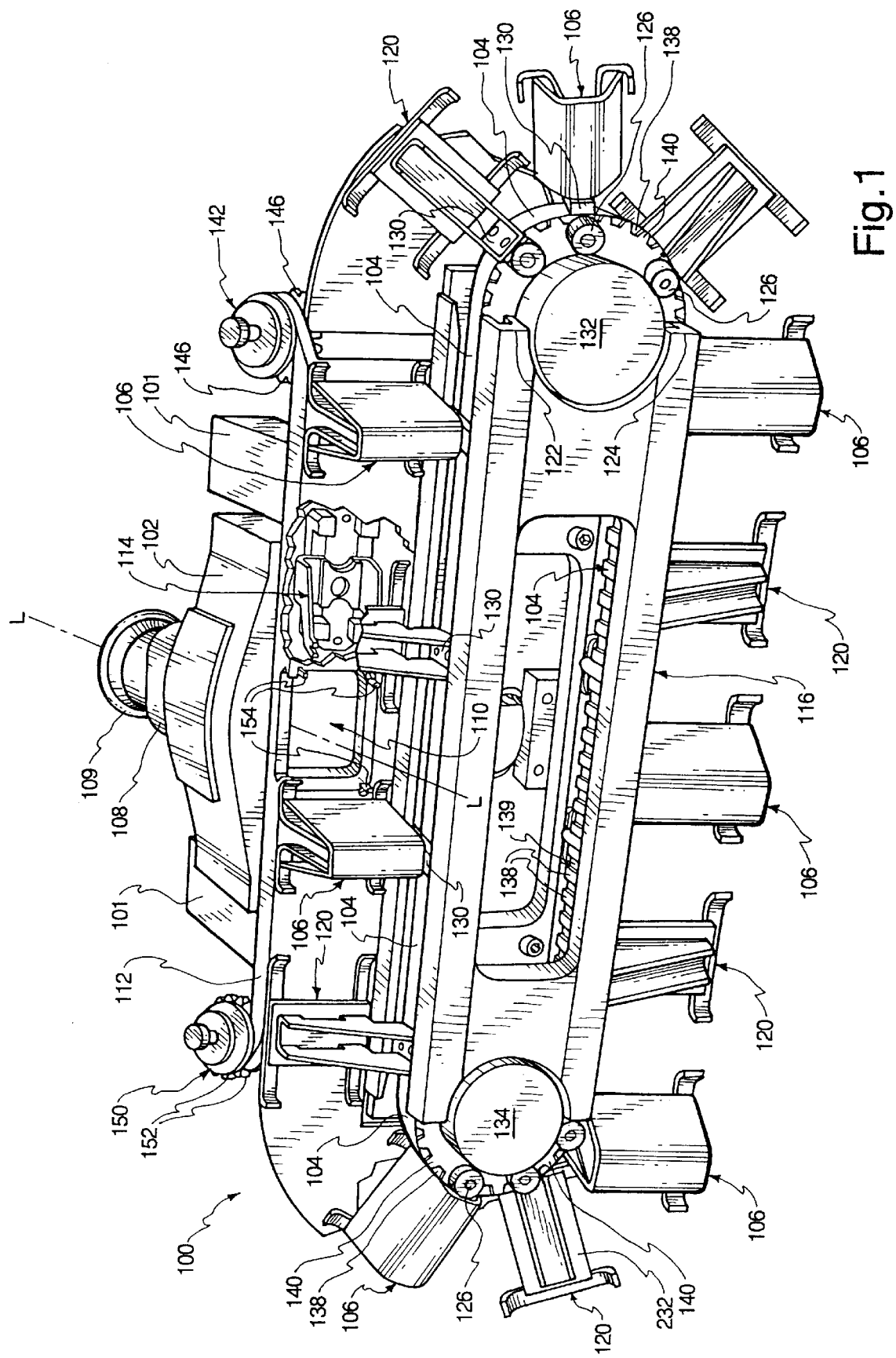
FIG. 1 is a perspective view of a projector according to the present invention.

FIG. 1 is a perspective view of the major components of a motion film projector 100 in accordance with the present invention. As shown, the projector 100 generally includes a base casting 101, a cam housing 102 adapted with an aperture block 110, a main lens 109, and a conveyor 104 for moving film through the projector. Multiple film carriages 106 mounted on the conveyor operate to receive and form loops of film and to transport sections of film into alignment with the aperture block 110. The aperture block 110, a lens holder 108, and the main lens 109 define an optical axis L along which the images on the film are projected. A deceleration mechanism 114 is mounted on the cam housing 102 to periodically engage and decelerate the film.

The conveyor 104 advances along a linear path by riding on a continuous track 116. The track 116 and the conveyor 104 are illustrated as lying in a plane orthogonal to the optical axis L. In this configuration, the conveyor 104 linearly advances the film carriages 106 and secondary shutters 120 across the aperture block 110 and in a direction orthogonal to the optical axis L. In addition, a light source (not shown), such as a lamp, may be positioned behind the conveyor 104 to provide illumination to project images disposed on the film through the aperture block 110 and the main lens 109.

Figure 2:
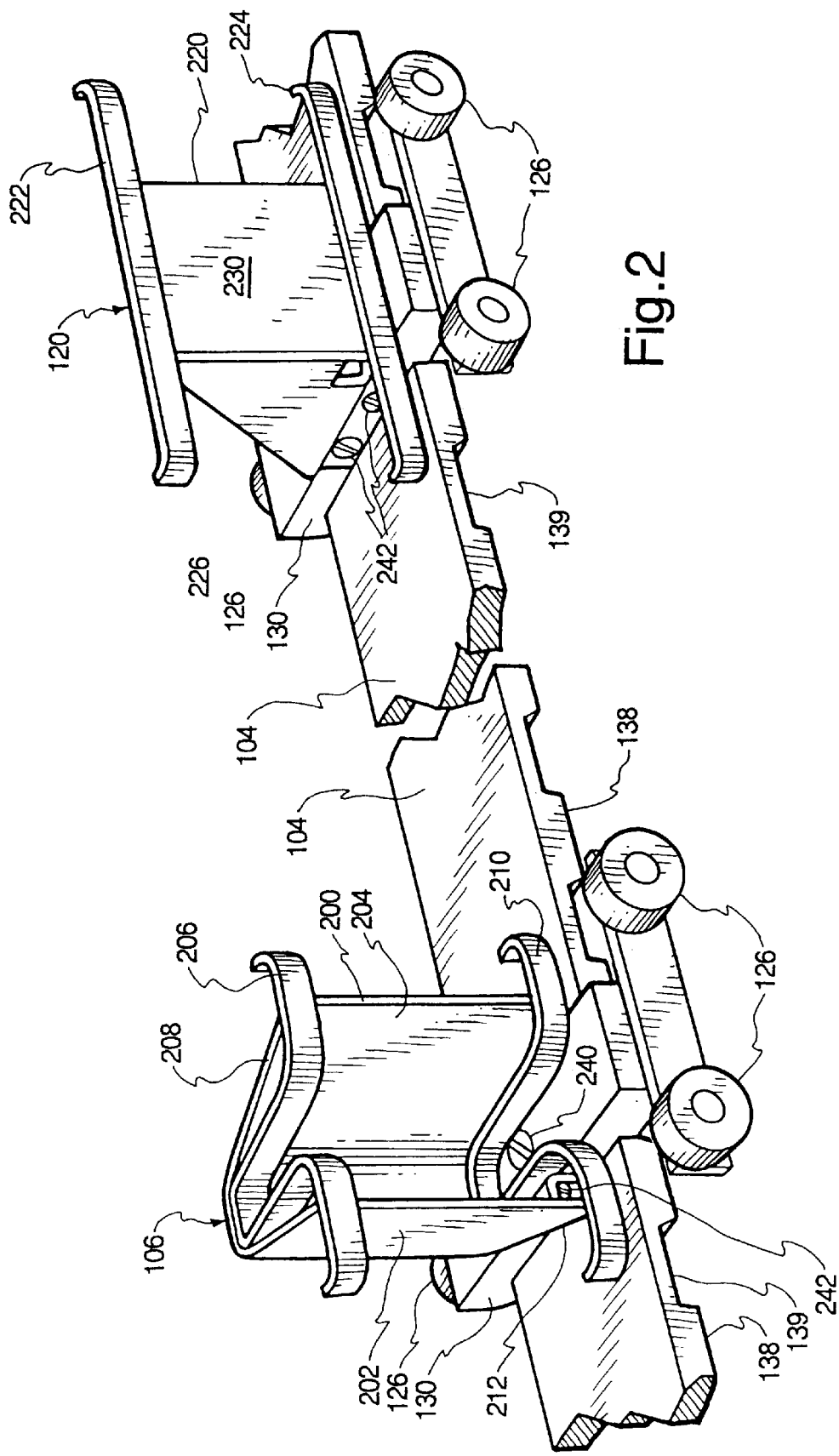
FIG. 2 is a perspective view of a film carriage and a secondary shutter mounted on a conveyor in accordance with the present invention.

The track 116 includes upper and lower raceways 122 and 124 respectively to accommodate rollers 126 secured to trucks 130. As shown, each film carriage 106 and each secondary shutter 120 is mounted on one of the trucks 130 (FIG. 2). The trucks 130, in turn, are secured in regularly spaced relation to one another about the conveyor 104.

Conveyor sprockets 132 and 134 are mounted on the base casting 101 and drive the conveyor 104 as the sprockets 132 and 134 rotate. As shown in FIG. 1, the sprockets 132 and 134 rotate in a counterclockwise direction to advance the film carriages 106 and the secondary shutters 120 from right to left across the aperture block 110. The conveyor 104 is preferably a timing belt having teeth 138 formed on a conveyor bottom surface 139. The conveyor teeth 138 engage corresponding teeth 140 formed in the sprockets 132 and 134 to permit the conveyor 104 to advance in timed relation with the rotation of the sprockets 132 and 134.

As the sprockets 132 and 134 rotate, they drive the conveyor 104 linearly along the raceways 122 and 124 of the track 116. Specifically, the conveyor 104 advances the truck rollers 126 along the raceways 122 and 124 to advance the trucks 130 along the track 116. The trucks 130, in turn, advance the film carriages 106 and the secondary shutters 120 behind the aperture block 110 in a direction orthogonal to the optical axis L.

An input sprocket 142 driven to rotate at a substantially constant rotational velocity is mounted on the base casting 101 to continuously advance film along a film path toward the aperture block 110 at a film input speed. In particular, the input sprocket 142 is shown as having teeth 146 formed thereon. The teeth 146 of the input sprocket 142 are sized and spaced about the input sprocket 142 to engage sprocket holes or perforations 402 (FIG. 5C) formed along top and bottom edges of the film. Thus, rotating the input sprocket 142 in a clockwise direction, as viewed from above, advances the film along the film path.

Likewise, the base casting 101 also has an output sprocket 150 driven at a constant rotational velocity mounted thereon to continuously advance the film along the film path away from the aperture block 110. In a manner similar to the input sprocket 142, the output sprocket 150 has teeth 152 that extend radially therefrom The output sprocket teeth 152 engage top and bottom sets of apertures formed in the film. Accordingly, as the output sprocket 150 rotates in a clockwise direction, as viewed from above, the output sprocket 150 continuously withdraws film from the projector along the film path.

The film guide 112 is securely mounted on the base casting 101 and includes a set of apertures through which register pins 154 extend. The register pins 154 are secured on the cam housing 102 adjacent to the aperture block 110 to temporarily secure sections of film in register with the aperture block 110. The register pins 154 are adapted to engage top and bottom sets of perforations within the film. In this configuration, a section of film may be temporarily secured by the register pins 154 in alignment with the aperture block 110 for projection of an image disposed on the film.

FIG. 2 illustrates a film carriage 106 and a secondary shutter 120 mounted on a section of the conveyor 104. Specifically, the film carriage 106 includes a vertically oriented U-shaped member 200 that has an exterior surface 202 and an inner surface 204. The film carriage 106 also includes a top film support 206 attached along the inner surface 204 and adjacent to a top edge 208. The top film support 206 supports the film in a substantially vertical orientation as the film passes through the projector 100 along the film path. Similarly, the film carriage 106 also includes a bottom film support 210 attached to the along the inner surface 204 and adjacent to a bottom edge 212. The film supports 206 and 210 are oriented horizontally and are substantially parallel to each other.

The secondary shutter 120 is shown as including a secondary shutter plate 220, top and bottom film supports 222 and 224, and a mounting bracket 226. The secondary shutter plate 220 is a vertically oriented planar member having a front surface 230 and a back surface 232 (FIG. 1). The mounting bracket 226 is secured to the secondary shutter plate back surface 232 to secure the secondary shutter 120 to the truck 130. As discussed below, the secondary shutter 120 shutters the aperture block 110 as it passes in front of the aperture block. The top and bottom film supports 222 and 224 are mounted on the secondary shutter plate front surface 230 adjacent to shutter plate top and bottom edges. In a manner similar to the film supports 206 and 210, the top and bottom film supports 222 and 224 support the film in a substantially vertical orientation as the film passes through the projector 100. Those skilled in the art will appreciate that the film carriages 106 and the secondary shutters 120 can be formed or machined.

The trucks 130 secure the film carriages 106 and the secondary shutters 120 to the conveyor 104. As shown, each truck 130 is securely attached to the conveyor 104 by a clamping mechanism which clamps to the conveyor 104 by tightening fasteners 240. The film carriages 106 and the secondary shutters 120, in turn, are securely mounted on the trucks 130 by fasteners 242. The fasteners 240 and 242 are preferably machine screws. Hence, in this configuration, as the sprockets 132 and 134 (FIG. 1) rotate, they linearly advance the conveyor 104. Linearly advancing the conveyor 104, in turn, causes the truck rollers 126 to roll along the raceways 122 and 124. As such, the conveyor advances the film carriages 106 and the secondary shutters 120 along a plane orthogonal to the optical axis L.

Figure 3:
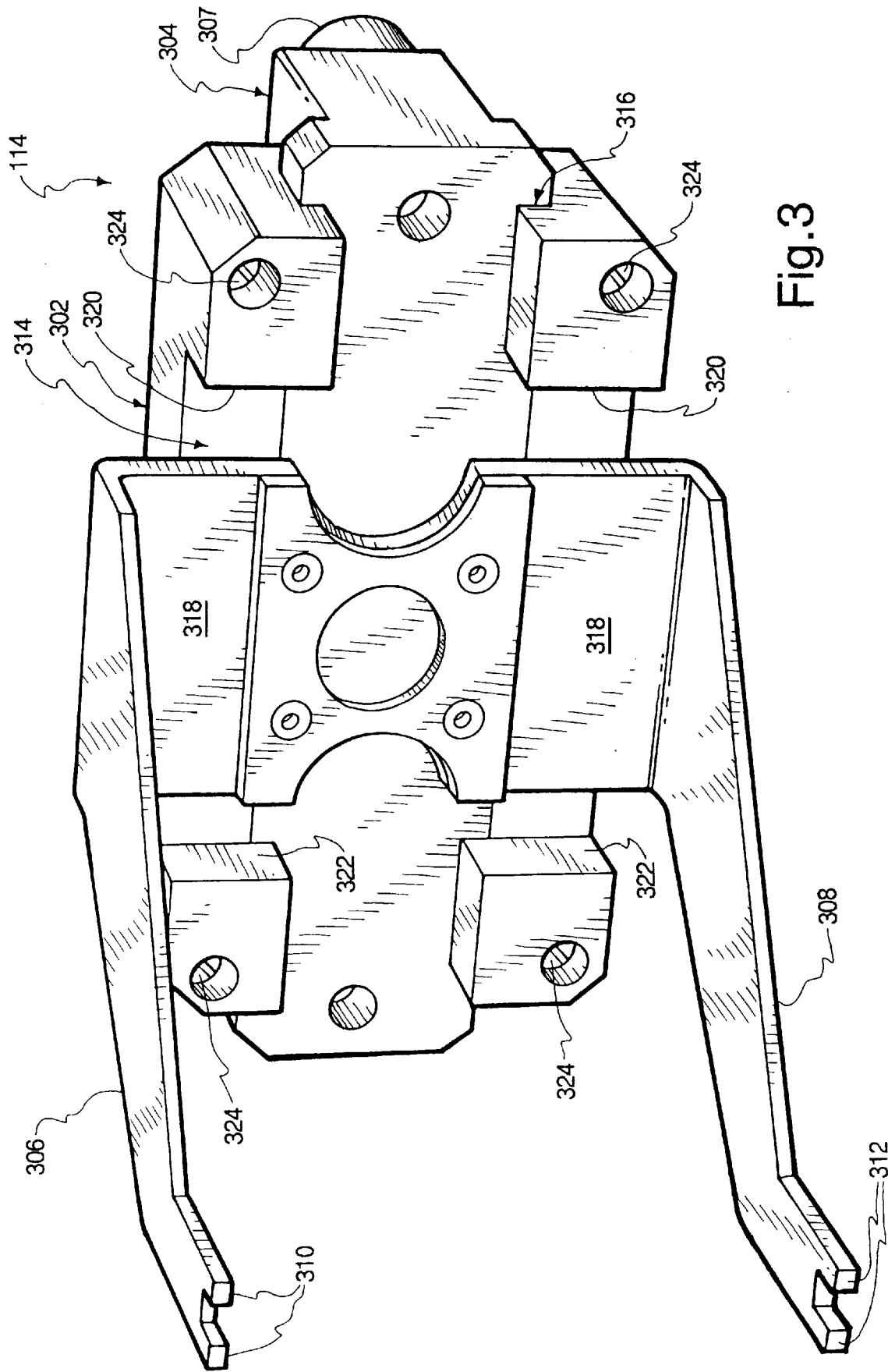
FIG. 3 is a perspective view of a deceleration mechanism according to the present invention.

FIG. 3 shows the film deceleration mechanism 114. As illustrated, the film deceleration mechanism 114 includes a mechanism housing 302, a sliding member 304, and top and bottom claw arms 306 and 308. The top and bottom claw arms 306 and 308 are attached to each other and to the sliding member 304 by a brace 318. Top and bottom claws 310 and 312 are formed on the ends of the top and bottom claw arms 306 and 308. As the film passes through the projector, the top and bottom claws 310 and 312 engage and decelerate the film before the film engages the register pins 154 as the sliding member slides linearly relative to the housing 302.

The mechanism housing 302 has a vertical groove 314 and a horizontal groove 316 formed therein. The sliding member 304 is slidingly disposed within the horizontal groove 316 and moves horizontally relative to the housing 302 in response to rollers 307 that ride on a rotating cam mechanism (not shown). Preferably, the deceleration mechanism is driven at a rate proportional to the rate of rotation of the conveyor sprockets 132 and 134 (FIG. 1) for timing purposes. Vertical edges 320 and 322 formed in the housing 302 define the vertical groove 314. Thus, as the cam mechanism (not shown) rotates, it drives the sliding member 304 back and forth horizontally. Fasteners 324 secure the mechanism housing 302 to the cam housing 102 (FIG. 1) between the input sprocket 146 and the register pins 154. In this configuration, the top and bottom claws 310 and 312 can periodically engage and decelerate the film before the film engages the register pins 154.

The operation of the projector will now be discussed with reference to FIGS. 4A–4E and FIGS. 5A–5F. These figures illustrate a film cycle according to the present invention. As shown in FIG. 4A, the film cycle begins with the projector 100 having a length of film 400 engaged with the input sprocket 142 and the output sprocket 150. The cycle also begins with a first section of film S1 momentarily, or temporarily, secured in alignment, or in register, with the aperture block 110 by register pins 154A and 154B.

Figure 5A:
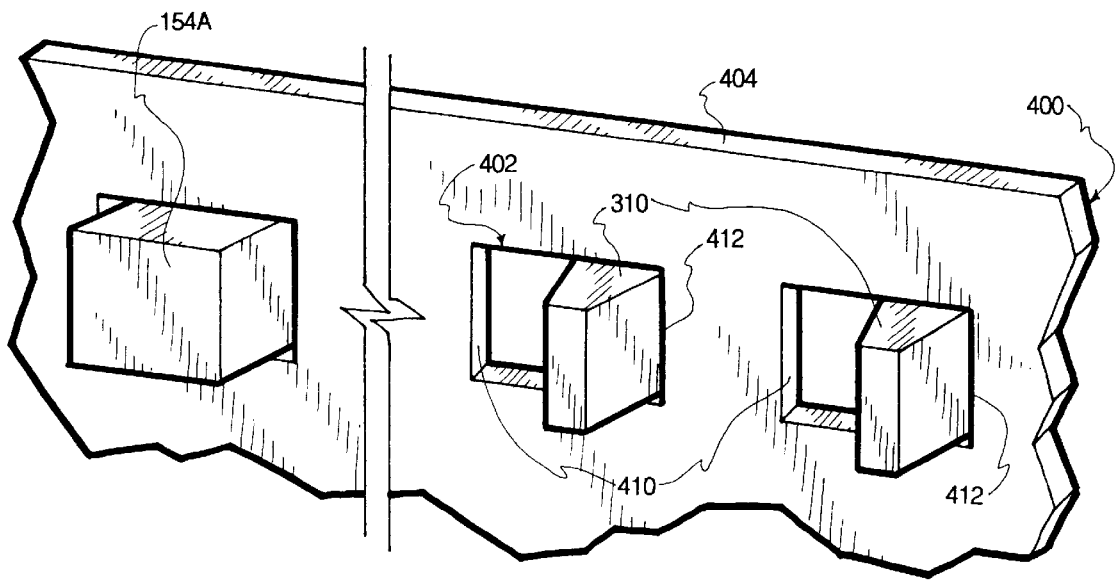
FIGS. 5A–5F are perspective breakaway views illustrating the operation of the deceleration mechanism of FIG. 3.

In the initial position shown in FIGS. 4A and 5A, the claws 310 and 312 of the deceleration mechanism also initially engage the film 400. Specifically, FIG. 5A–5F show the film 400 as having perforations 402 formed therein adjacent to film top and bottom edges 404 and 406. As shown in FIG. 5A, each perforation 402 has a front edge 410 and a back edge 412. Initially, the top and bottom claws 310 and 312 engage and contact the film 400 against the back edges 412 of the perforations 402 as shown in FIG. 5A. FIG. 5C also shows the register pins 154A, 154B, 154C, and 154D engaged with perforations 402 formed in the film 400 to momentarily secure the film 400 at the register pins 154A–154D.

FIG. 4A illustrates the beginning of the film cycle with a developing first loop of film L1 positioned within a film carriage 106A and a decaying, or diminishing, second loop of film L2 positioned within a film carriage 106B. The film loop L1 includes a leading edge 502, an apex 504, and a trailing edge 506. Additionally, secondary shutters 120A and 120B are positioned adjacent to the film carriages 106A and 106B respectively. In this initial configuration, an image (not shown) disposed on the first section of film S1 may be projected through the aperture block 110. For example, positioning a lamp (not shown) adjacent to the first section of film S1 opposite the conveyor 104 and in substantial alignment with the aperture block 110 causes the image disposed on the section of film S1 to be projected through the aperture block 110.

Throughout the film cycle, the input sprocket 142 continuously advances the film 400 toward the register pins 154. Likewise, the output sprocket 150 continuously advances film away from the register pins 154. Preferably, the input and output sprockets 142 and 150 rotate at substantially the same speed. In this manner, the input sprocket 142 feeds film into the projector 100 at substantially the same rate the output sprocket 150 withdraws film from the projector 100. In this manner, the driven sprockets 142 and 150 continuously pass the film 400 through the projector 100.

As shown in FIG. 4B, the conveyor 104 has linearly advanced the film carriages 106A and 106B and the secondary shutters 120A and 120B in a direction orthogonal to the optical axis L. In particular, the conveyor 104 has advanced the secondary shutter 120A into alignment with the aperture block 110 to shutter the aperture block 110.

The section of film S1 remains stationary as the film cycle proceeds from the position of FIG. 4A to the position of FIG. 4B since the register pins 154 momentarily, or temporarily, immobilize the section of film S1. Consequently, the film loop L1 absorbs the film continuously fed into the projector by the input sprocket 142. Hence, the film loop L1 is shown as being larger than it was in FIG. 4A due to additional film having been fed into the projector by the input sprocket 142. Similarly, the film withdrawn from the projector 100 by the output sprocket 150 comes from the film loop L2 and, therefore, the film loop L2 shown in FIG. 4B is smaller than the film loop L2 shown in FIG. 4A.

Figure 5B:
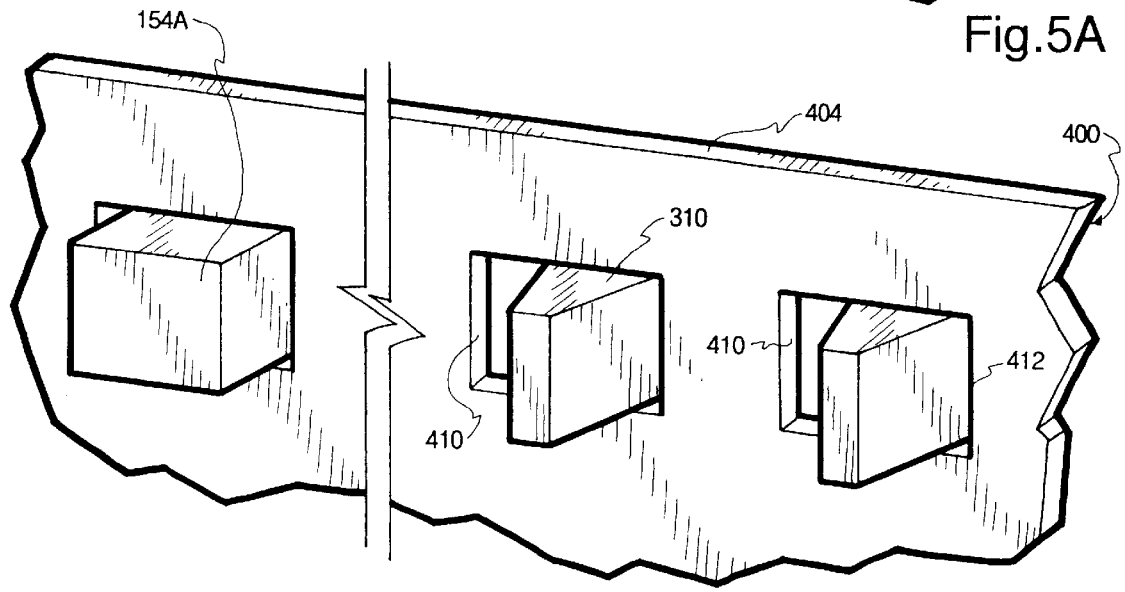
Figure 5C:
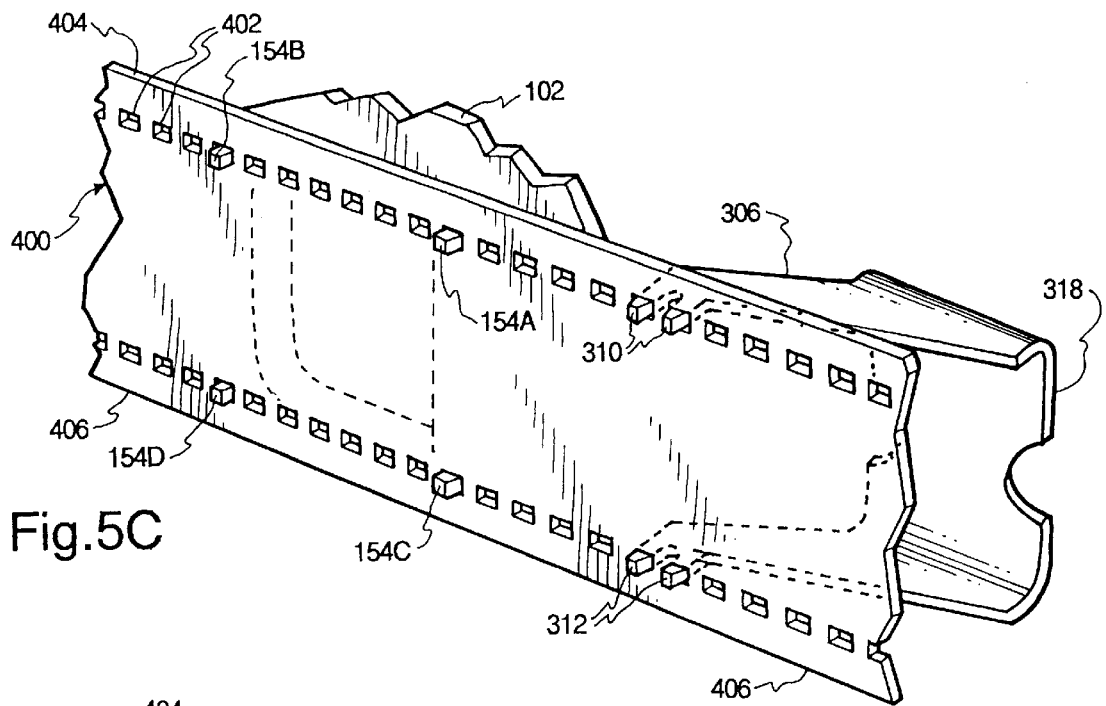

Additionally, as the film cycle advances from the position shown in FIG. 4A to the position shown in FIG. 4B, the claws 310 and 312 move from the position shown in FIG. 5A to the position shown in FIGS. 5B and 5C. The claws 310 and 312 move slightly toward the register pins 154 and away from the perforation back edges 412 to permit the film 400 to be disengaged from the claws 310 and 312 without damaging the film 400. As shown in FIGS. 5B and 5C, the claws 310 and 312 are positioned centrally between the edges 410 and 412 of the perforations 402.

FIG. 4C shows the film carriages 106A and 106B advanced linearly from the position of FIG. 4B. Likewise, the conveyor 104 has advanced the secondary shutter 120A out of alignment with the aperture block 110 and has advanced a secondary shutter 120C into a position adjacent to the film 400. In this configuration, the projector 100 can project the image disposed on the section of film S1 a second time because neither the film carriages 106 nor the secondary shutters 120 are aligned with the aperture block 110.

In FIG. 4C, the section of film S1 remains immobilized by the register pins 154. Therefore, the film loop L1 continues to absorb the film 400 fed into the projector 100 by the input sprocket 142 and continues to grow. Likewise, the film loop L2 continues to supply the film 400 withdrawn from the projector 100 by the output sprocket 150 and, consequently, continues to shrink. As such, as the conveyor 104 advances from the position of FIG. 4B to the position of FIG. 4C, the film loop L1 gradually and continuously increases in size and the film loop L2 gradually and continuously decreases in size.

After the claws 310 and 312 have moved from the position shown in FIG. 5A to that of FIGS. 5B and 5C, the leading edge 502 of the loop L1 passes over the claws 310 and 312. As the leading edge 502 passes over the claws 310 and 312, the loop L1 lifts the film 400 out of engagement with the claws 310 and 312 as shown in FIG. 4C. Moving the claws 310 and 312 to the position of FIG. 5B prior to disengaging the film 400 from the claws 310 and 312 reduces, or eliminates, interference between the claws 310 and 312 and the film 400 as the loop L1 lifts the film 400 from the claws 310 and 312. Reducing the interference between the film 400 and the claws 310 and 312 reduces wear on the film 400.

Figure 5D:
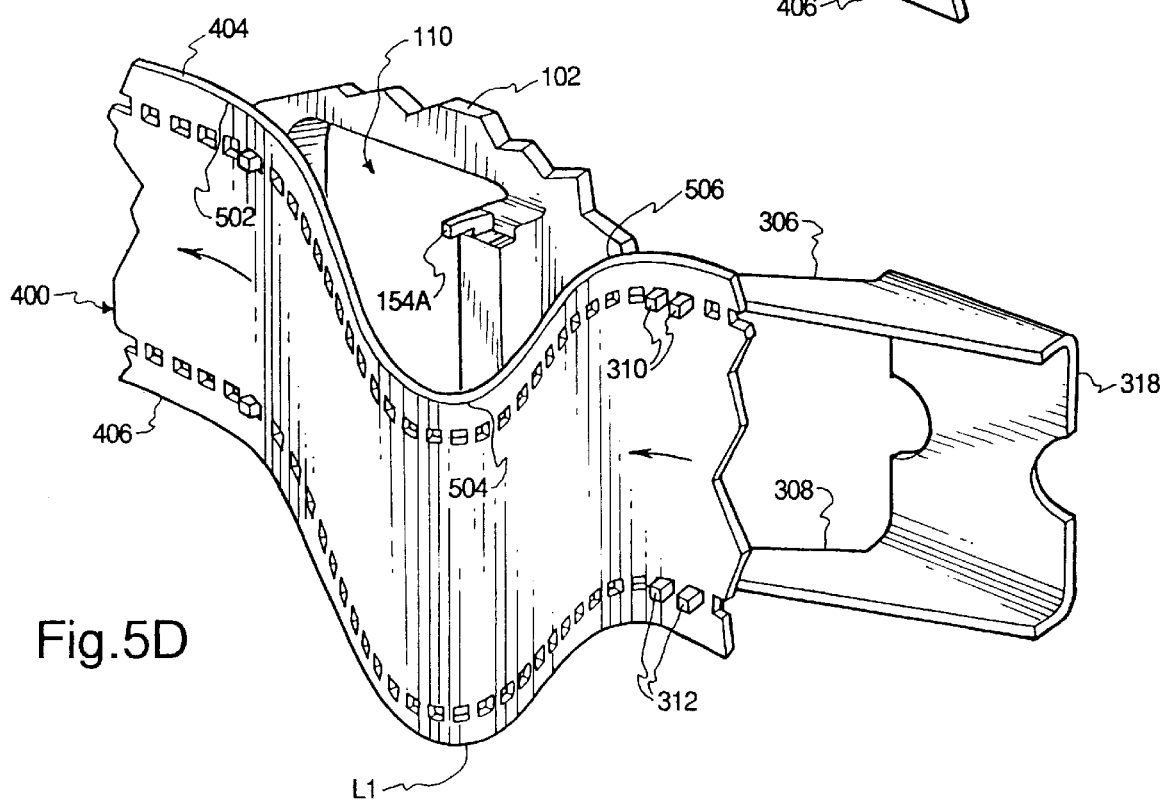

As shown in FIGS. 4C and 5D, after the film loop leading edge 502 has passed over and become disengaged from the claws 310 and 312, the claws 310 and 312 move backward, or away from the aperture block 110, to engage the film 400. In particular, the sliding member 304 slides horizontally in a direction away from the register pins 154 so that the brace 318 slides toward the housing edge 320 (FIG. 3). Once the deceleration mechanism 114 has moved the claws 310 and 312 from the position of FIG. 4C into the position shown in FIG. 5D, the trailing edge 506 of the film loop L1 engages the claws 310 and 312.

Figure 5E:
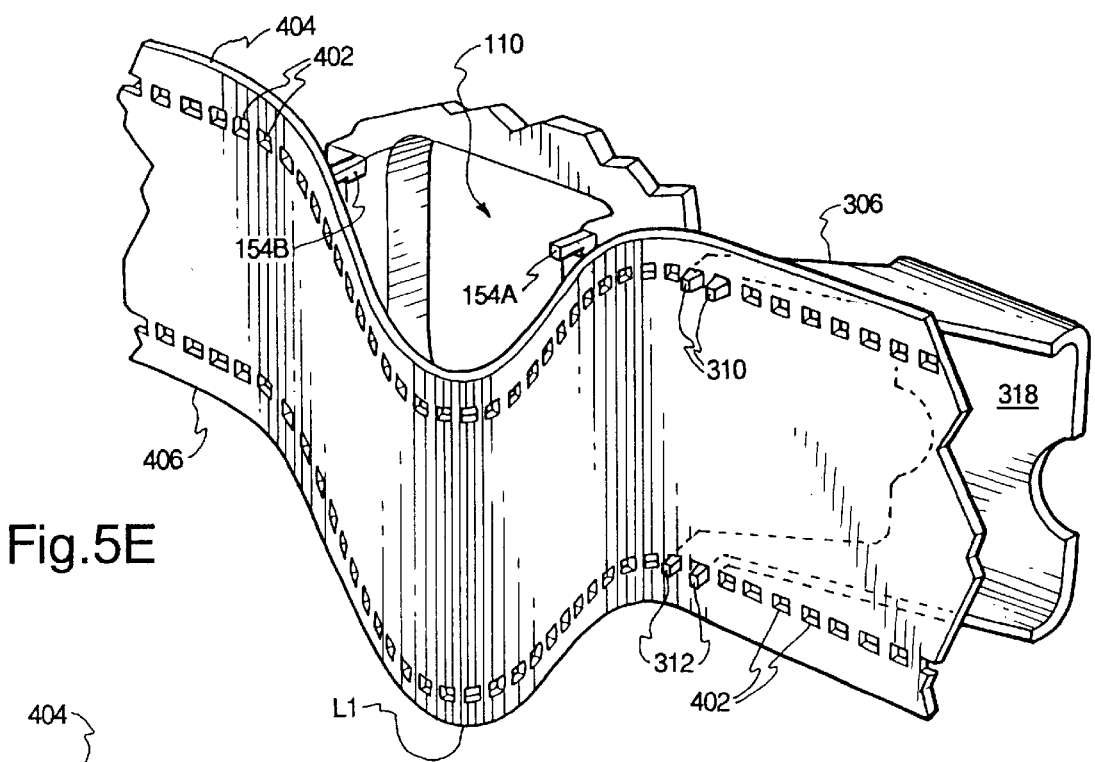
Figure 5F:
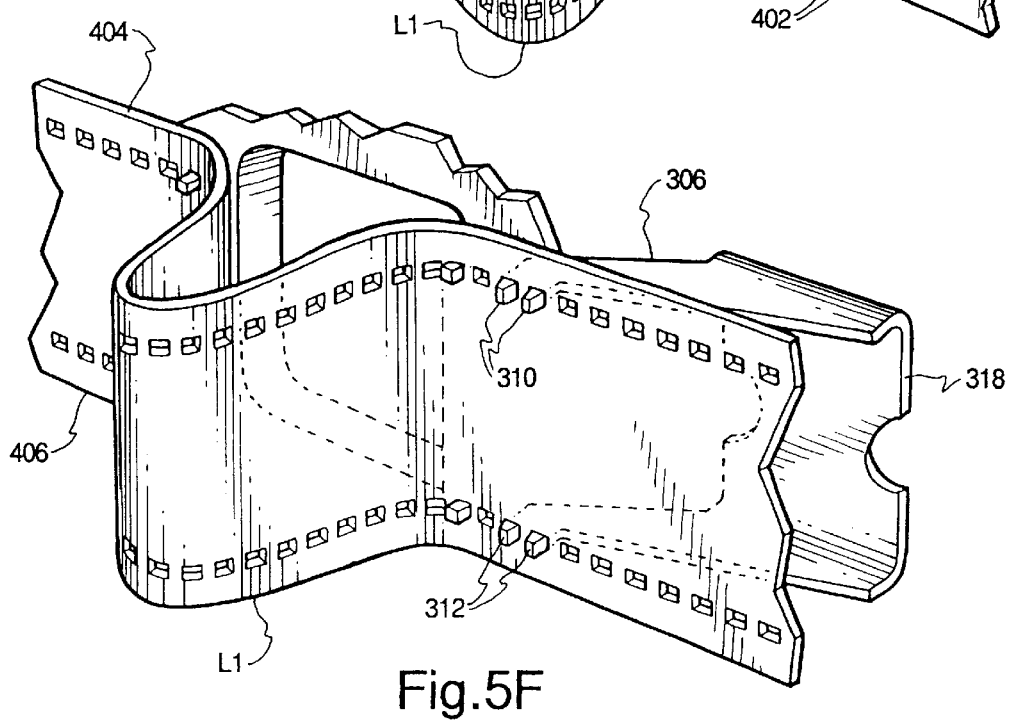

Then, as illustrated in FIG. 5E, the deceleration mechanism 114 then decelerates the film 400 by advancing the claws 310 and 312 forward, or toward the register pins 154, at a speed less than the input speed of the film. The claws 310 and 312 continue to move toward the register pins 154 until the claws 310 and 312 return to the position shown in FIG. 4D and FIG. 5F. Thus, the claws 310 and 312 decelerate the film 400 as the claws 310 and 312 move from the position shown in FIG. 5D to the position shown in FIG. 5E.

FIG. 4D further illustrates the film carriage 106A advanced into substantial alignment with the aperture block 110. The conveyor 104 has also advanced the secondary shutters 120A and 120C linearly along the film path. Additionally, the film loop L2 has disappeared and the film carriage 106B is no longer adjacent to the film.

As the film carriage 106A advances the film loop L1 from the position of FIG. 4C to the position of FIG. 4D, the leading edge 502 of the film loop L1 rolls over the register pins 154A. Consequently, the section of film S1 becomes disengaged from the register pin 154A, but remains engaged with the register pin 154B, thus forming a portion of the loop L1. The trailing edge 506 also rolls over the register pin 154A to engage the trailing edge 506 with the register pin 154A as shown in FIG. 4D. In the position shown in FIG. 4D, the film carriage 106A blocks the admission of light through the film into the aperture block 110 and, thus, functions as a shutter.

FIG. 4E shows the film carriage 106A advanced out of alignment with the aperture block 110 and a second section of film S2 momentarily secured in alignment with the aperture block 110. As the leading edge 502 of the film loop L1 rolls from the position of FIG. 4D to the position of 4E, the rolling loop L1 lifts the film 400 out of engagement with the register pins 154B and 154D. Then, the trailing edge 506 of the film loop L1 engages the register pins 154B and 154D as the rolling loop L1 advances from the position shown in FIG. 4D to the position shown in FIG. 4E. In the configuration shown in FIG. 4E, the projector 100 may project an image disposed on the section of film S2 by passing light through the section of film S2.

The projector 100 continually repeats this process to continuously transport film into and out of the projector 100 and to project images disposed on the film.

The invention has been described above with reference to a specific embodiment. It will, however, be evident that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A motion picture film transport system, comprising:
   a housing having a aperture block, the aperture block having an optical axis;
   a conveyor having a linear direction of travel oriented orthogonal to the optical axis;
   a set of regularly spaced film carriages configured to form and deform transitory film loops and transport the film loops into register with the aperture block, the carriages being mounted to the conveyor and advancing in a linear direction therewith.

2. A film transport system according to claim 1 further comprising a set of shutters mounted to the conveyor for intermittently shuttering the aperture block.

3. A film transport system according to claim 2 wherein the film carriages and shutters are arranged in alternating sequence on the conveyor.

4. A film transport system according to claim 1 wherein each film carriage comprises a vertically oriented U-shaped member.

5. A film transport system according to claim 1 further comprising a deceleration mechanism coupled to the housing for engaging and decelerating the film.

6. A film transport system, comprising:

a housing having a aperture block, the aperture block having an optical axis;

a supply sprocket for supplying film to the aperture block;

a take-up sprocket for receiving film from the aperture block;

a conveyor for transporting film along a linear path from the supply sprocket to the take-up sprocket across the aperture block, the conveyor lying in a plane orthogonal to the optical axis; and a set of film carriages configured to transport transitory film loops to the aperture block, the carriages being coupled to the conveyor.

7. A film transport system according to claim 6, further comprising:

a set of shutters coupled to the conveyor for intermittently shuttering the aperture block.

8. A film transport system according to claim 6, further comprising a track lying in a plane orthogonal to the optical axis of the aperture block, the linear conveyor being coupled to the track by rollers to permit the linear conveyor to advance along the track.

9. A film transport system according to claim 6, further comprising:

a set of register pins coupled to the housing and positioned adjacent to the aperture block for temporarily securing the film in alignment with the aperture block;

a deceleration mechanism, coupled to the housing, for periodically engaging the film to decelerate the film prior to the film becoming secured by the register pin.

10. A film transport system according to claim 6 wherein the linear conveyor further comprises a timing belt.

11. A method of continuously advancing film for intermittent exposure in a cinematographic device, comprising:

temporarily securing the film at a point so that a first section of the film is in register with an aperture block;

continuously moving the film toward the point along a straight line;

forming a loop of film within an opaque film carriage;

moving the film carriage in a direction orthogonal to an optical axis of the aperture block and toward the point to simultaneously increase the size of the loop and to roll the loop toward the aperture block;

rolling the loop over the point to release the film from the point and to secure a trailing edge of the loop at the point so that a second section of film is in register with the aperture block; and moving the opaque film carriage across the optical axis of the aperture block to shutter the aperture block.

12. A method of continuously advancing film according to claim 11, further comprising the step of momentarily positioning a shutter in alignment with the aperture block to shutter the aperture block.

13. A method of continuously advancing film according to claim 11, wherein the step of moving the film carriage is performed by a linear conveyor.

14. A method of continuously advancing film according to claim 11, further comprising the step of decelerating the film prior to securing the trailing edge at the point.

15. A method of advancing film through a motion picture device, comprising the steps of:

forming a loop of film within a film carriage;

advancing the film carriage along a straight line toward an aperture block to roll the loop of film toward the aperture block;

aligning a section of the film with an aperture block;

projecting an image disposed on the section of film; and advancing a shutter along a straight line into alignment with the aperture block to shutter the aperture block.

16. A method of advancing film according to claim 15 wherein the step of advancing the film carriage and the step of advancing the shutter are accomplished by a conveyor belt coupled to the film carriage and the shutter, the conveyor lying in a plane orthogonal to a optical axis of the aperture block.

17. A method of advancing film according to claim 15 further comprising the step of momentarily securing the film at a point adjacent to the aperture block.

18. A system for advancing film, comprising:

means for forming a loop of film within a film carriage;

means for advancing the film carriage along a straight line toward an aperture block to roll the loop of film toward the aperture block;

means for aligning a section of the film with the aperture block;

means for projecting an image disposed on the section of film; and means for advancing a shutter along a straight line into alignment with the aperture block to shutter the aperture block.

19. A system for advancing film according to claim 18 further comprising means for momentarily securing the film at a point adjacent to the aperture block.

20. A system for advancing film according to claim 18 further comprising means for decelerating the film.

* * * * *